US012562676B2

(12) United States Patent
Rizzo

(10) Patent No.: US 12,562,676 B2
(45) Date of Patent: *Feb. 24, 2026

(54) LEVERS FOR SOLAR PANEL CLAMP ASSEMBLIES

(71) Applicant: DynoRaxx, Inc., Buffalo, NY (US)

(72) Inventor: Nathan T. Rizzo, Buffalo, NY (US)

(73) Assignee: DYNORAXX, INC., Buffalo, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/674,181

(22) Filed: May 24, 2024

(65) Prior Publication Data

US 2024/0313695 A1      Sep. 19, 2024

Related U.S. Application Data

(63) Continuation-in-part of application No. 18/072,775, filed on Dec. 1, 2022, now Pat. No. 12,413,180.

(60) Provisional application No. 63/468,910, filed on May 25, 2023, provisional application No. 63/284,792, filed on Dec. 1, 2021.

(51) Int. Cl.
H02S 20/23      (2014.01)

(52) U.S. Cl.
CPC ................................... H02S 20/23 (2014.12)

(58) Field of Classification Search
CPC .. H02S 30/10; H02S 20/23; F16B 2/02; F16B 2/18; F16M 13/02; F24S 25/11; F24S 25/16; F24S 25/634; F24S 2025/6003; F24S 20/60
See application file for complete search history.

(56) References Cited

U.S. PATENT DOCUMENTS

| | | |
|---|---|---|
| 11,056,998 B2 | 7/2021 | Martin |
| 2019/0178274 A1 | 6/2019 | Katz |
| 2019/0222169 A1 | 7/2019 | Yang |
| 2022/0368276 A1 | 11/2022 | Jasmin |
| 2023/0170843 A1 | 6/2023 | Rizzo |

*Primary Examiner* — Kourtney R S Carlson
(74) *Attorney, Agent, or Firm* — Barclay Damon LLP

(57) ABSTRACT

Clamp assemblies and systems for mounting solar panels to mounting units are presented. For instance, a clamp assembly for clamping a solar panel includes a clamp portion and a lever portion. The clamp portion includes at least one tooth for clamping onto a first flange of the solar panel. The lever portion is spaced apart from the clamp portion and includes a cam a. The cam includes a rounded surface and a flat surface. Each of the clamp portion and the lever portion comprise an opening for receiving a pivoting element. The opening is generally aligned when the clamp portion and the lever portion are fitted together. Upon rotation of the lever portion, the cam urges the clamp portion into a clamped condition.

18 Claims, 17 Drawing Sheets

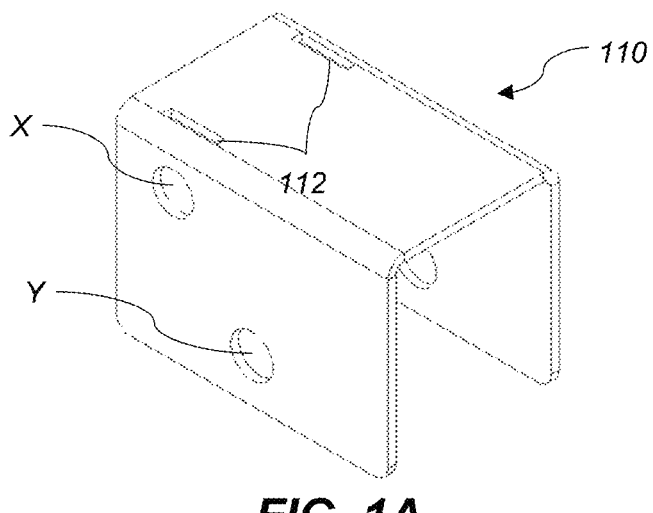
FIG. 1A
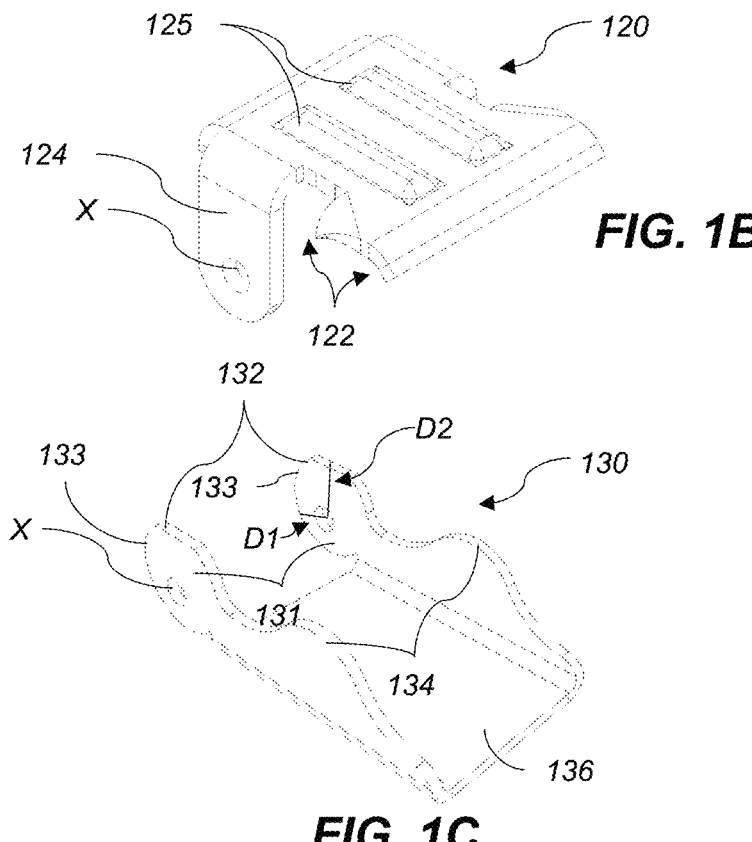
FIG. 1B
FIG. 1C

*400 OR 500*

*600-A, 600-B*

*LOOSE*

*900*

*400 OR 500*

*CLAMPED*

*600-A, 600-B*

*900*

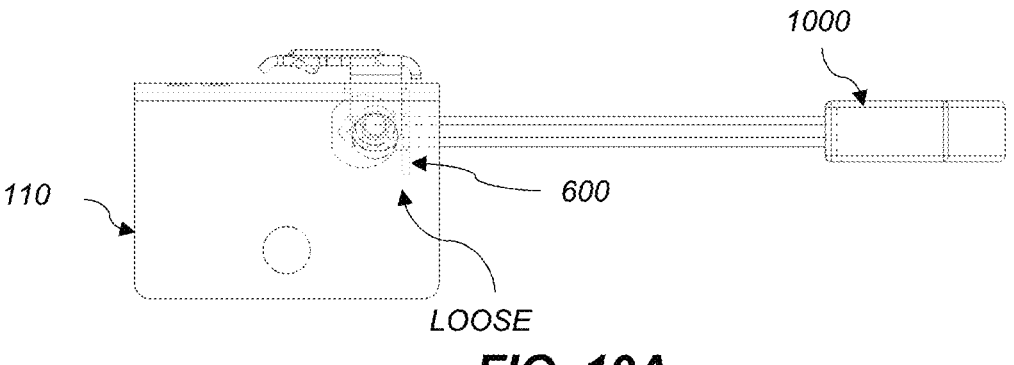
110
1000
600
LOOSE
FIG. 10A
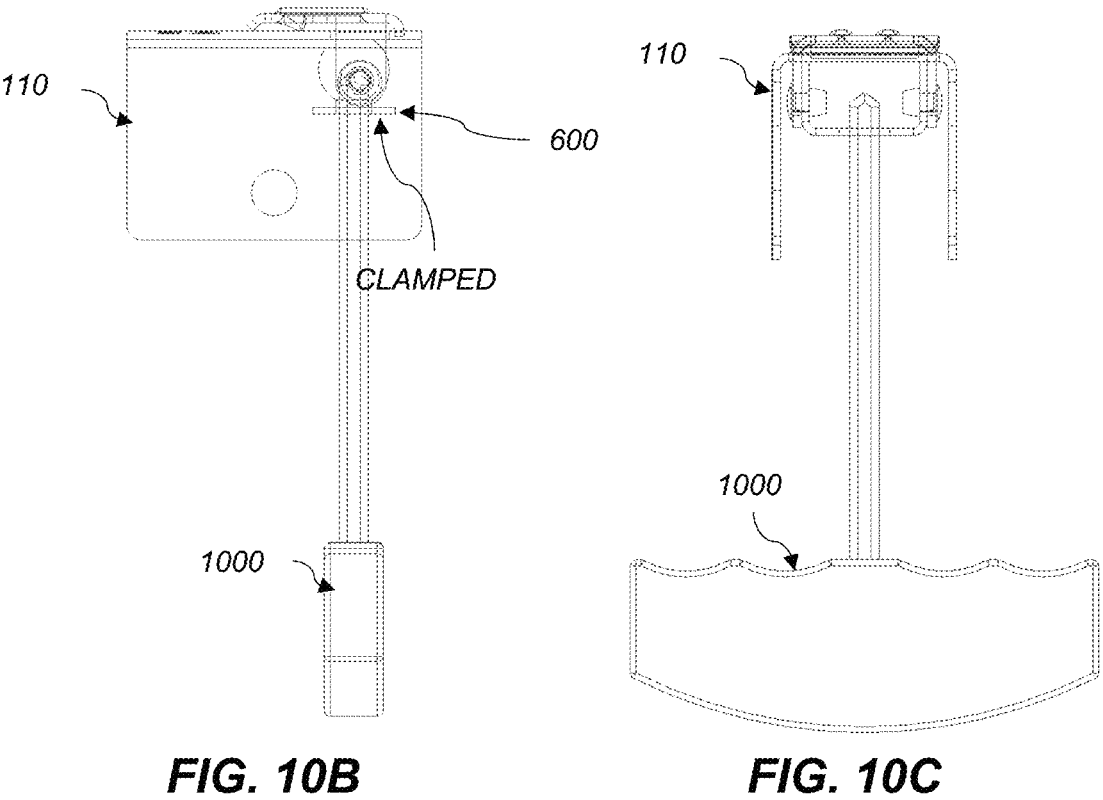
110
600
CLAMPED
1000
FIG. 10B
110
1000
FIG. 10C

*110*

*600-C*

*LOOSE*

*1100*

*1100*

*600-C*

*110*

*CLAMPED*

LEVERS FOR SOLAR PANEL CLAMP ASSEMBLIES

CROSS REFERENCE TO RELATED APPLICATIONS

This application claims priority to U.S. Provisional Patent Application Ser. No. 63/468,910, filed on May 25, 2023, and is a continuation in part of U.S. patent application Ser. No. 18/072,775, filed Dec. 1, 2022, which claims priority to U.S. Provisional Patent Application Ser. No. 63/284,792 filed Dec. 1, 2021, the entirety of each of which is incorporated herein for all purposes.

BRIEF SUMMARY

In one embodiment, a clamp assembly for clamping a solar panel includes a clamp portion and a lever portion. The clamp portion includes at least one tooth for clamping onto a first flange of the solar panel. The lever portion is spaced apart from the clamp portion and include a cam. The cam includes a rounded surface and a flat surface. Each of the clamp portion and the lever portion comprise an opening for receiving a pivoting element. The opening is generally aligned when the clamp portion and the lever portion are fitted together. Upon rotation of the lever portion from a position in which the rounded surface of the cam rotates along the bottom of a support portion to a position in which the flat surface of the cam locks against the bottom of the support portion, the cam urges the clamp portion into a clamped condition such that the at least one tooth clamps onto the first flange of the solar panel.

In another embodiment, a clamp assembly for mounting a solar panel to a mounting unit is presented. For example, the clamp assembly includes a saddle portion, a clamp portion and a lever portion. The saddle portion has a means for mounting the saddle portion to a tower of the mounting unit. The clamp portion is fitted into a top of the saddle portion and comprising at least one tooth for clamping onto a first flange of the solar panel. The lever portion is fitted into a bottom of the saddle portion. The lever portion comprises a cam. The cam comprises a rounded surface and a flat surface. Each of the saddle portion, the clamp portion and the lever portion comprise an opening for receiving a pivoting element. The openings are generally aligned when the saddle portion, the clamp portion and the lever portion are fitted together. Upon rotation of the lever portion from a position in which the rounded surface of the cam rotates along the bottom of the saddle portion to a position in which the flat surface of the cam locks against the bottom of the saddle portion, the cam urges the clamp portion into a clamped condition such that the at least one tooth clamps onto the first flange of the solar panel.

In a further embodiment, a system for mounting a solar panel to a plurality of mounting units is presented. For example, a plurality of clamp assemblies as described in the first embodiment discussed above are positioned on towers of the mounting units and are used to clamp a solar panel in place at an angle to the mounting units.

An advantage realized in one or more embodiments described herein is that secure installation may be achieved because the clamps may be attached to the solar panel using the cam-actuated self-locking clamp assembly using a matched tool. Another advantage realized in one or more embodiments described herein is that the clamp can be first attached to the solar panel and then the solar panel can be attached to the mounting units, creating great efficiencies in the installation of solar panels. Another advantage realized in one or more embodiments described herein is that the clamping assembly is universal to solar panels by virtue of clamping a bottom flange of the solar panel, and thereby being able to clamp any thickness solar panel.

The above embodiments are exemplary only. Other embodiments as described herein are within the scope of the disclosed subject matter.

BRIEF DESCRIPTION OF THE SEVERAL VIEWS OF THE DRAWINGS

So that the manner in which the features of the disclosure can be understood, a detailed description may be had by reference to certain embodiments, some of which are illustrated in the accompanying drawings. It is to be noted, however, that the drawings illustrate only certain embodiments and are therefore not to be considered limiting of its scope, for the scope of the disclosed subject matter encompasses other embodiments as well. The drawings are not necessarily to scale, emphasis generally being placed upon illustrating the features of certain embodiments. In the drawings, like numerals are used to indicate like parts throughout the various views, in which:

FIG. 1A illustrates a saddle portion of a clamp assembly, in accordance with one or more aspects set forth herein; and FIG. 1B illustrates a clamp portion of the clamp assembly, in accordance with one or more aspects set forth herein; and FIG. 1C illustrates a lever portion of the clamp assembly, in accordance with one or more aspects set forth herein.

FIGS. 7A-7B, 8A-8B, 9A-9B, 10A-10C and 11A-11B illustrate operation of the lever portions of FIGS. 6A-6C, in accordance with one or more aspects set forth herein.

Corresponding reference characters indicate corresponding parts throughout several views. The examples set out herein illustrate several embodiments, but should not be construed as limiting in scope in any manner.

DETAILED DESCRIPTION

The present disclosure relates to the installation of solar panels on a roof of a building or structure. The prior art describes the use of mounting units with towers of different heights that allow a solar panel to be installed at an angle relative to the roof and mounting units. In some conventional systems, rails are used between the towers of the mounting unit, and the solar panel is installed on top of these rails. In such a case, rails are used to mount the solar panels without tools and in the regular spacing required.

For example, U.S. Pat. No. 8,850,754 B2 to the same inventor of the present disclosure, entitled Molded Solar Panel Racking Assembly, was granted Oct. 7, 2014, and is incorporated herein in its entirety for any purpose including for the purpose of enablement and written description. The '754 patent requires the use of rails extending between the towers of the mounting units in order to support the solar panels. These rails can be expensive to procure and install. Applicant has discovered that the present technique, in some embodiments, can eliminate these expensive rails. Applicant's technique makes use of clamp assemblies described below, and rails are not required.

During installation of solar panels, conventional systems require that a variety of tools and components are carried and used by the installer. For instance, multiple bolts and other fasteners are typically required for installation of each solar panel. This forces the installer to perform hundreds of discrete tasks using many different tools and hundreds of separate components while stationed on the roof of a building or structure. Clearly this can lead to increased labor costs when installing solar panels, in addition to other disadvantages. In addition, bolts and screws can tend to loosen over time due to vibration from the wind and other sources, meaning that continued maintenance tasks are required to ensure operation of the installation.

Figure 1D:
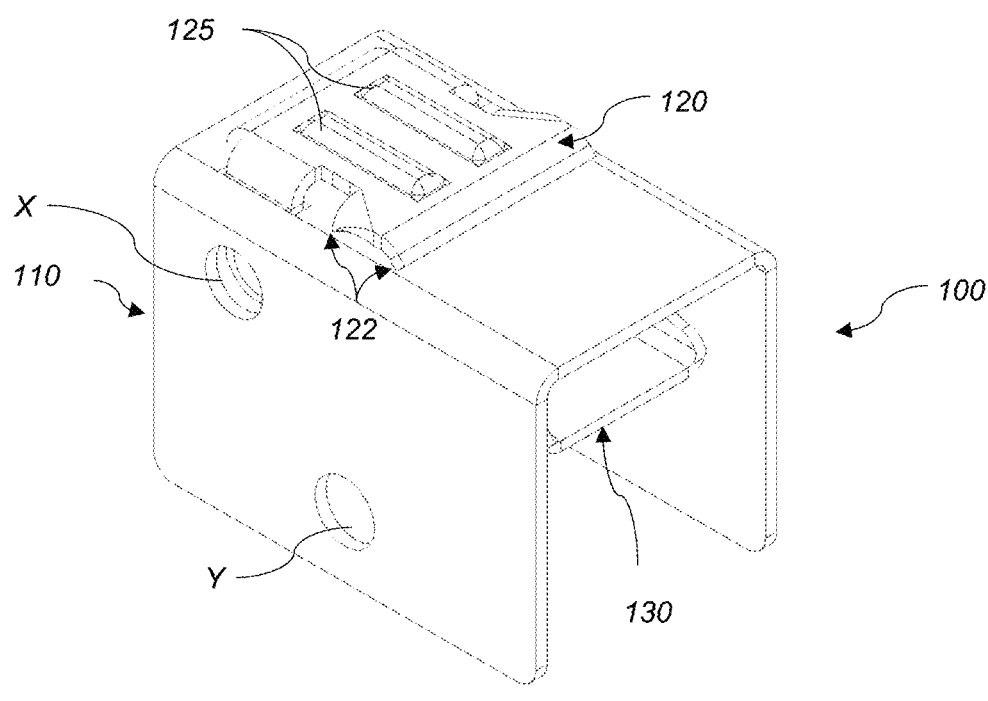
FIGS. 1D-1I illustrate the partially assembled clamp assembly, in accordance with one or more aspects set forth herein.

FIG. 1A illustrates a saddle portion 110 of a clamp assembly 100 (shown assembled in FIGS. 1D-IF). The saddle portion 110 may be attached to posts of a mounting unit 210 or 220 (shown in FIGS. 2A-2C) using opening Y. Slots 112 facilitate assembly and opening X lines up with the openings X of the other portion when the clamp assembly 100 is assembled, as described below.

Figure 1E:
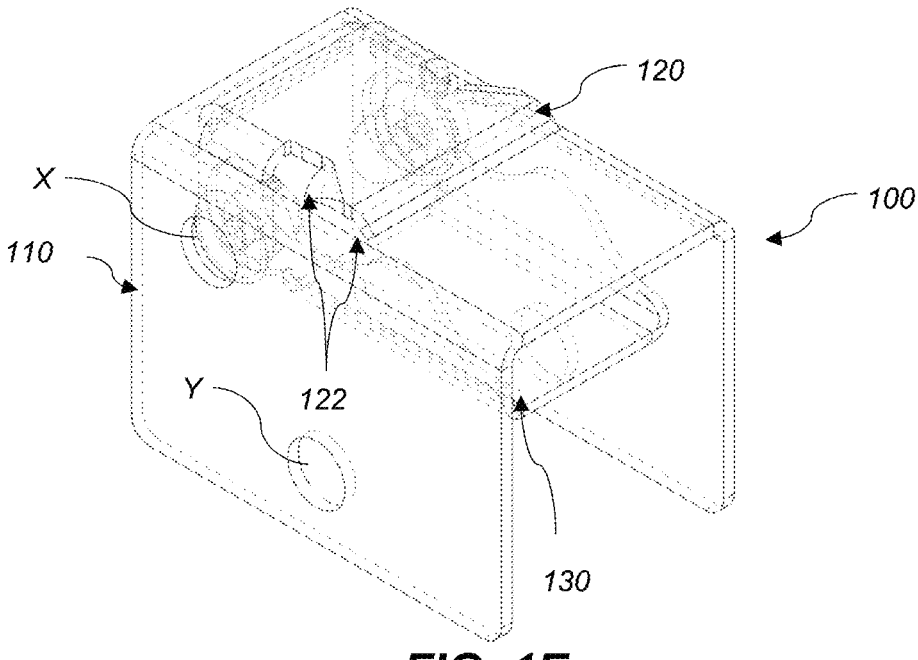
Figure 1F:
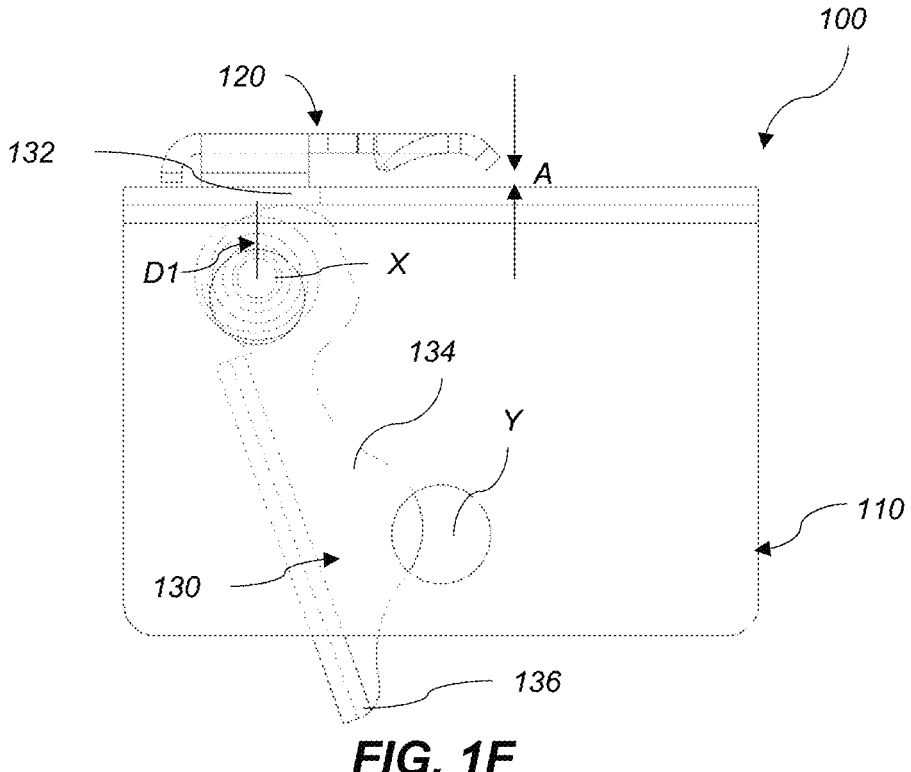

FIG. 1B illustrates a clamp portion 120 of the clamp assembly 100 (shown assembled in FIGS. 1D-1F). Clamp portion 120 includes tabs 124 which include openings X, which may be inserted into slots 112 of the saddle portion 110. Clamp portion 120 includes teeth 122 which will grip the frame of a solar panel, as described below. Clamp portion 120 may also include ribs 125 which add to the structural integrity of claim portion 124, which will assist in gripping the frame of a solar panel, as described below. For instance, ribs 125 strengthen the clamp portion 120 to mitigate loosening of the at least one tooth clamped onto the first flange of the solar panel when the clamp portion 120 is in the clamped condition, as described below.

FIG. 1C illustrates a lever portion 130 of the clamp assembly 100 (shown assembled in FIGS. 1D-1F). Lever portion 130 includes cams 131 which include openings X which align with the openings X of the saddle portion 110 and clamp portion 120 when assembled together. Lever portion 130 includes a portion 136 used to rotate the lever along the axis of openings X, and guards 134 which prevent over-rotation. Cams 131 include flat surfaces 132 and curved surfaces 133. In the embodiment of FIG. 1C, D1 is the diameter of cam 131 to the curved surface as shown, and D2 is the diameter of cam 131 to the flat surface 132 as shown, and D2 is greater than D1, facilitating the locking of the solar panel by the clamp as explained below.

FIGS. 1D-1F illustrate the partially assembled clamp assembly 100. As may be seen, the saddle portion 110, clamp portion 120 and lever portion 130 are assembled together such that openings X align. Rivets may be used to join the clamp assembly 100 at openings X. The tolerances of the clamp assembly are such that when the portion 136 of the lever portion 130 is pushed downward, the lever portion 130 rotates clockwise such that the flat surfaces 132 unlock from the saddle and the lever portion releases its force on the clamp portion 120 to unlock the clamp portion 120 from the top of the saddle portion 110. In addition, guard portion 134 prevents further rotation in the counterclockwise direction, preventing over-torqueing and preventing potential damage to a clamped solar panel.

Figure 1G:
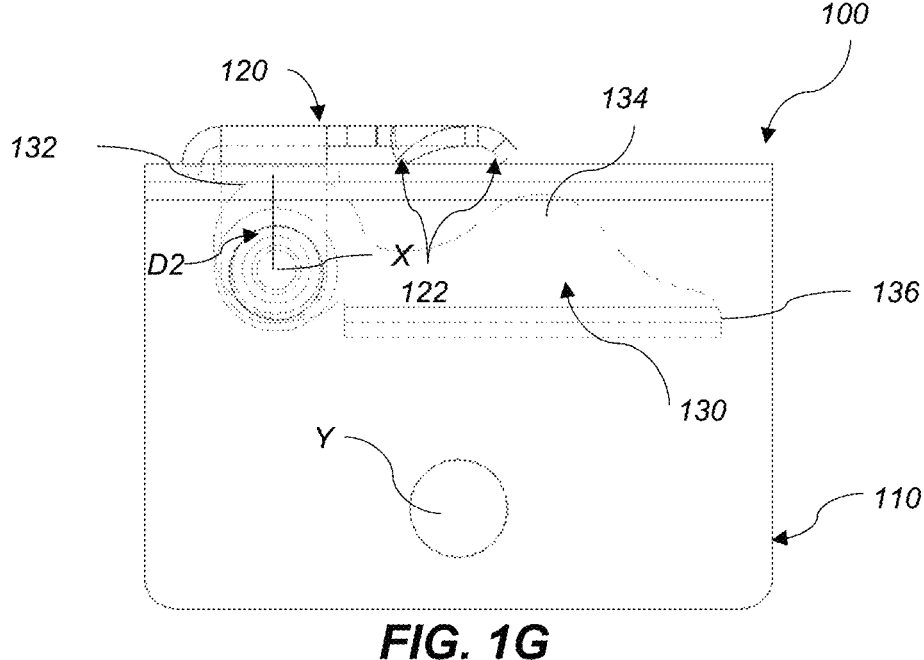

FIG. 1F depicts the lever portion 120 in the loose, unlocked or unclamped condition. As depicted in FIG. 1F, lever 136 is rotated to about a 5 o'clock position, such that diameter D1 is oriented upwards, such that lever portion 120 causes clamp portion 120 to be loose such that teeth 122 are not urged against the saddle 110. FIG. 1G depicts the lever portion 120 in the locked or clamped condition. As depicted in FIG. 1F, level 136 is rotated to about a 3 o'clock position, such that diameter D2, which is greater than diameter D1, is oriented upwards, thus urging clamp portion 120 downward such that teeth 122 are disposed against the saddle portion 110.

Figures 1H, 1I:
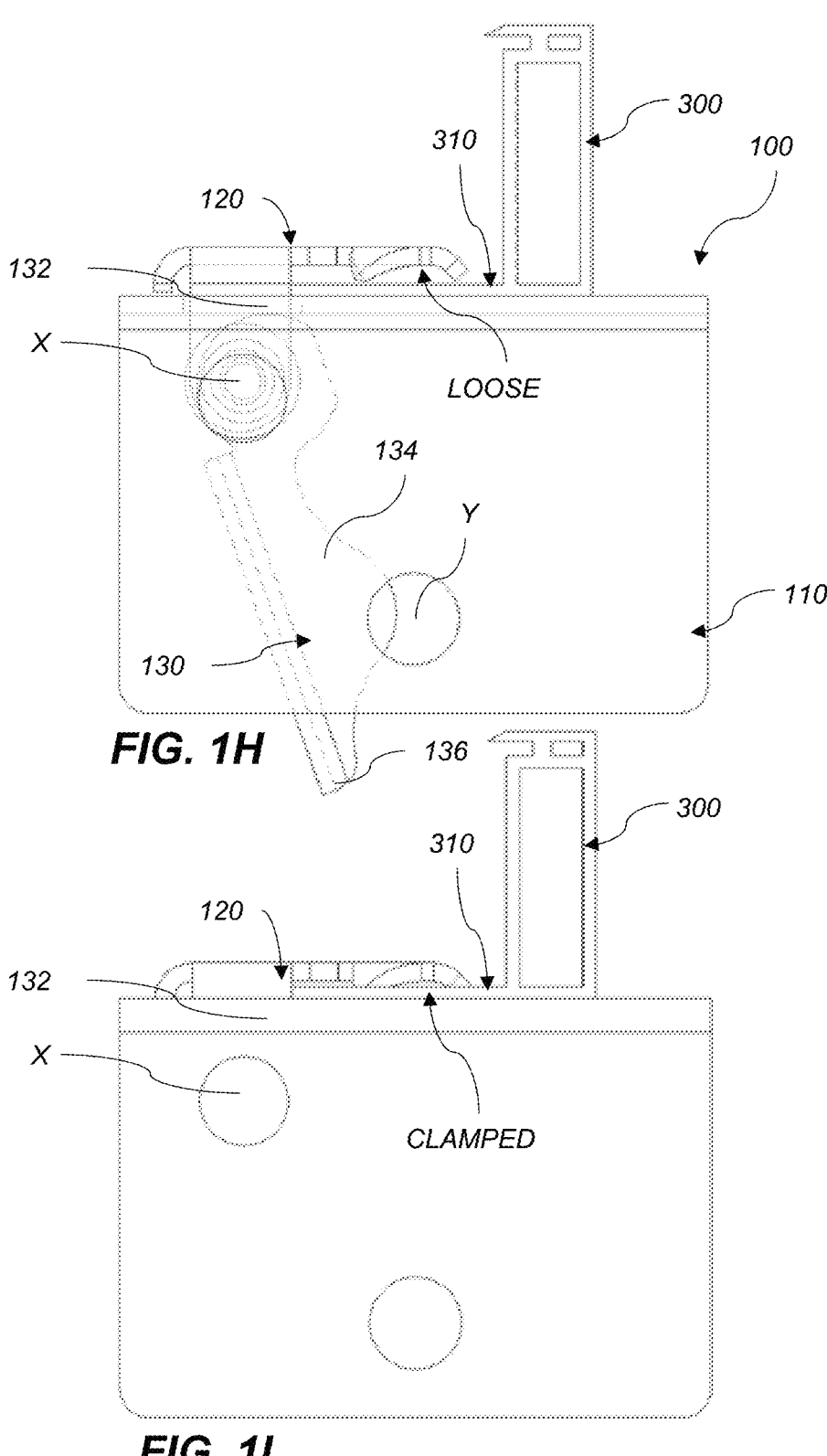

FIG. 1H, like FIG. 1F, depicts the lever portion 120 in the loose, unlocked or unclamped condition, this time with frame portion 310 of solar panel 300 placed between the clamp portion 120 and the saddle portion 110. As depicted in FIG. 1H, lever 136 is rotated to about a 5 o'clock position, such that diameter D1 is oriented upwards, such that lever portion 120 causes clamp portion 120 to be loose such that teeth 122 are not urged towards the saddle 110 and thus teeth 122 do not engage with the frame portion 310 (which may be described as the bottom flange of solar panel). FIG. 1I, like FIG. 1G, depicts the lever portion 120 in the locked or clamped condition, this time with frame portion 310 of solar panel 300 placed between the clamp portion 120 and the saddle portion 110. As depicted in FIG. 1F, the frame portion is the bottom flange of the solar panel. As depicted in FIG. 1F, level 136 is rotated to about a 3 o'clock position, such that diameter D2, which is greater than diameter D1, is oriented upwards, thus urging clamp portion 120 downward such that teeth 122 engage frame portion 310 and hold it against the saddle portion 110.

Advantageously, by clamping the bottom flange of a solar panel, the clamps described herein are more universal in use because, unlike conventional fasteners that fasten the top flange of a solar panel, the thickness of the solar panel need not be accounted for. In conventional fasteners, different part numbers will need to be stocked for different solar panels of different thickness. Of course, conventional fasteners such as bolts or screws cannot be installed on a lower flange, unlike the clamps of the present disclosure. Furthermore, by clamping the bottom flange of the solar panel, it is less likely that the fastening will be loosened because the cam lock is below the plane of the top surface.

Figures 2A, 2B:
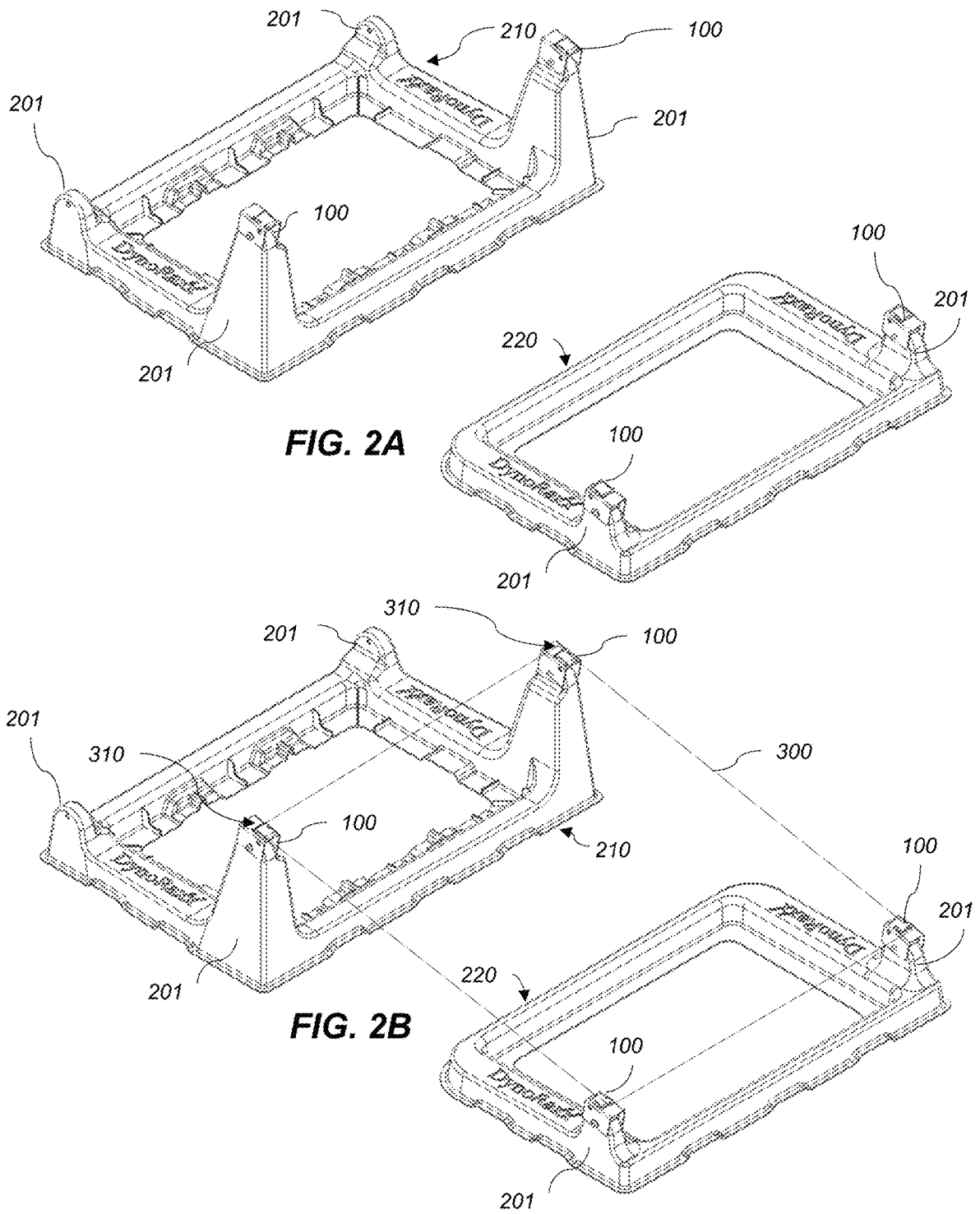
FIG. 2A illustrates two mounting units with clamp assemblies shown on posts of the mounting units, in accordance with one or more aspects set forth herein.
FIGS. 2B & 2C illustrate a solar module assembled to the clamp assemblies on the posts of the two mounting units of FIG. 2A, in accordance with one or more aspects set forth herein.
Figure 2C:
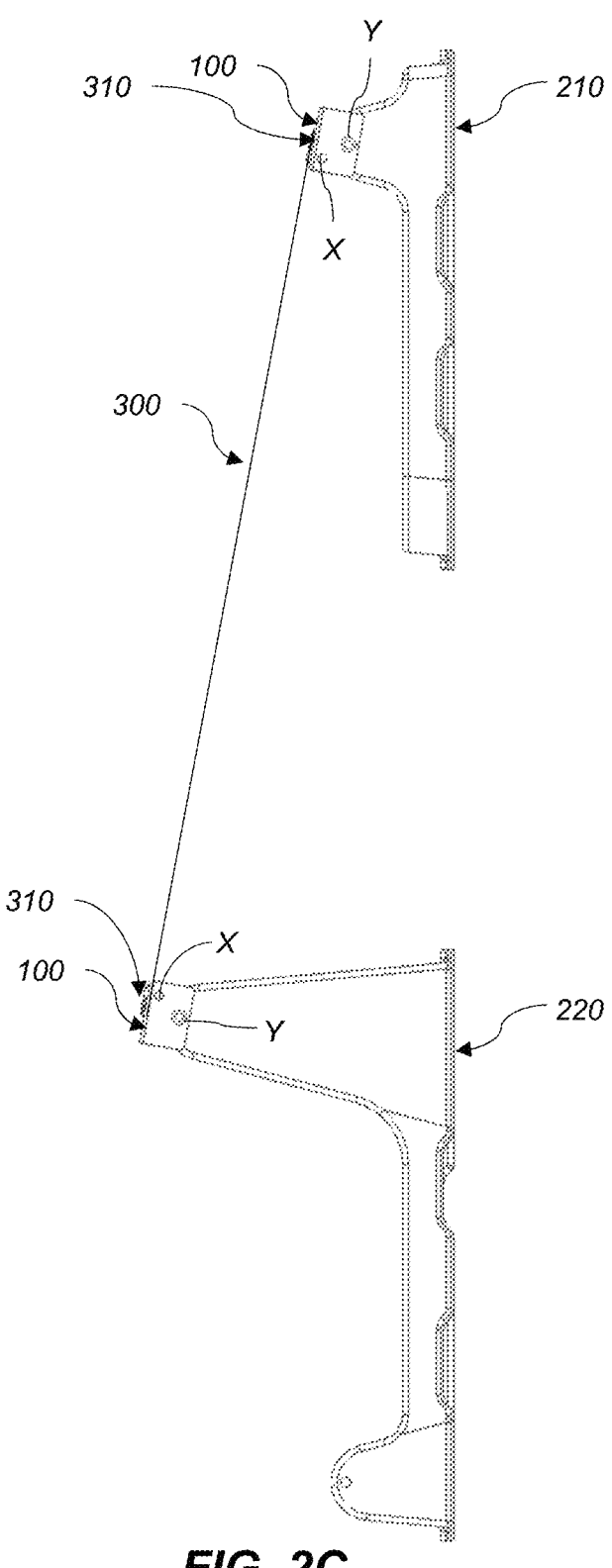

FIGS. 2A-2C illustrates two mounting units 210 and 220 with clamp assemblies 100 shown on posts 201 of the mounting units 210, 220. As depicted in FIG. 2B, a solar panel 300 may be positioned across four clamp assemblies 100 and clamped into place, with the details of the frame 310 being clamped as shown in FIGS. 1F-1I.

Figure 3A:
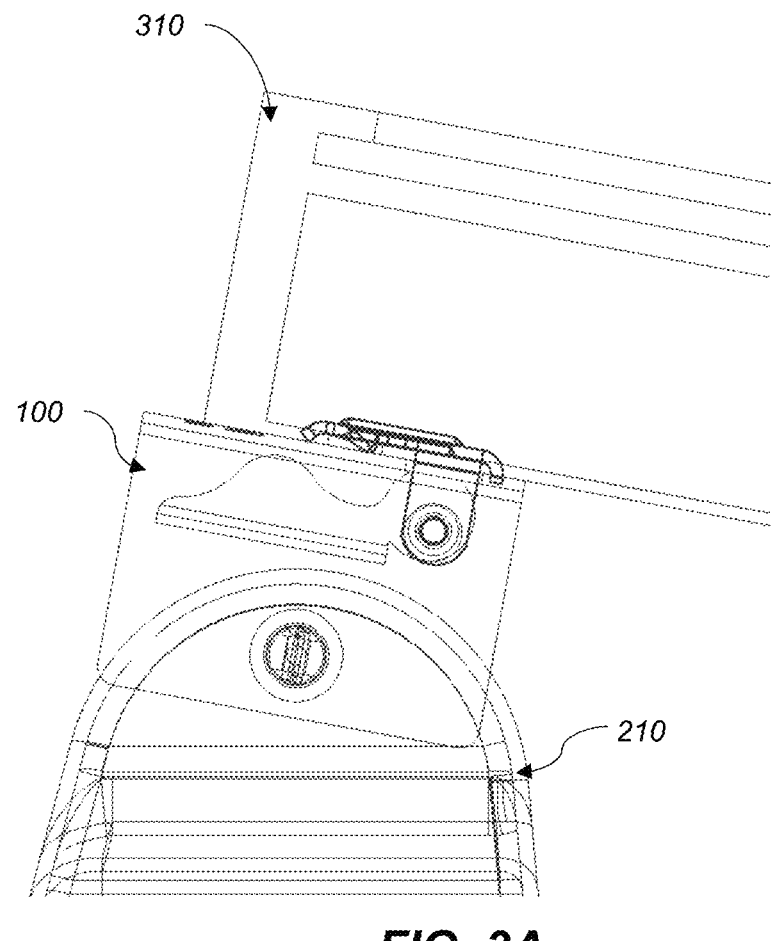
FIGS. 3A-3D illustrate examples of the operation of the clamp assemblies, in accordance with one or more aspects set forth herein.
Figures 3B, 3C:
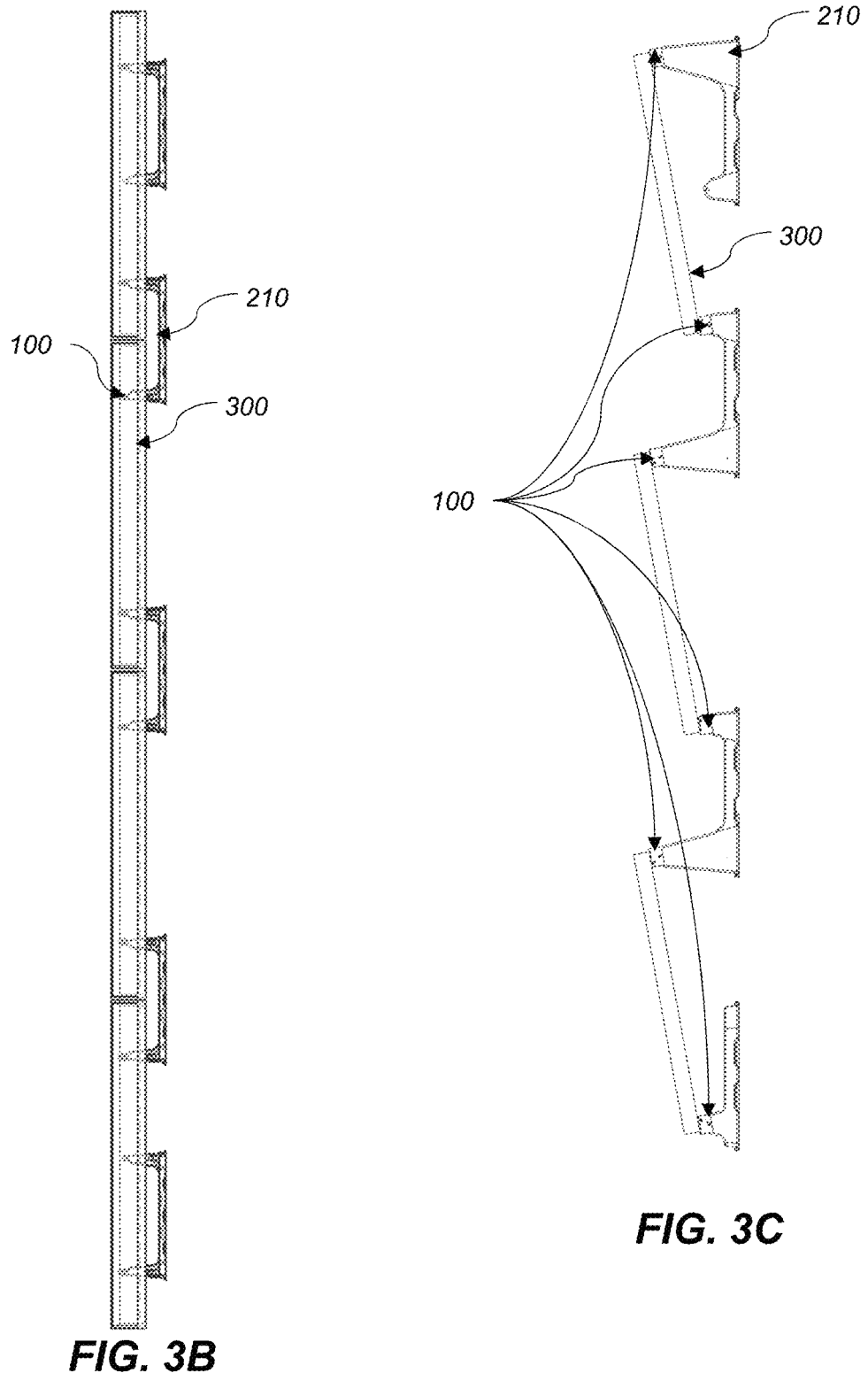

FIGS. 3A-3D illustrate example embodiments of the operation of the clamp assemblies 100 when used with solar panels 300 and mounting units 210. For instance, FIG. 3A depicts a clamp assembly 100 attached to a mounting unit 210. A frame portion 310 of a solar panel 300 is then clamped by the clamp assembly 100. As shown in FIGS.

Figure 3D:
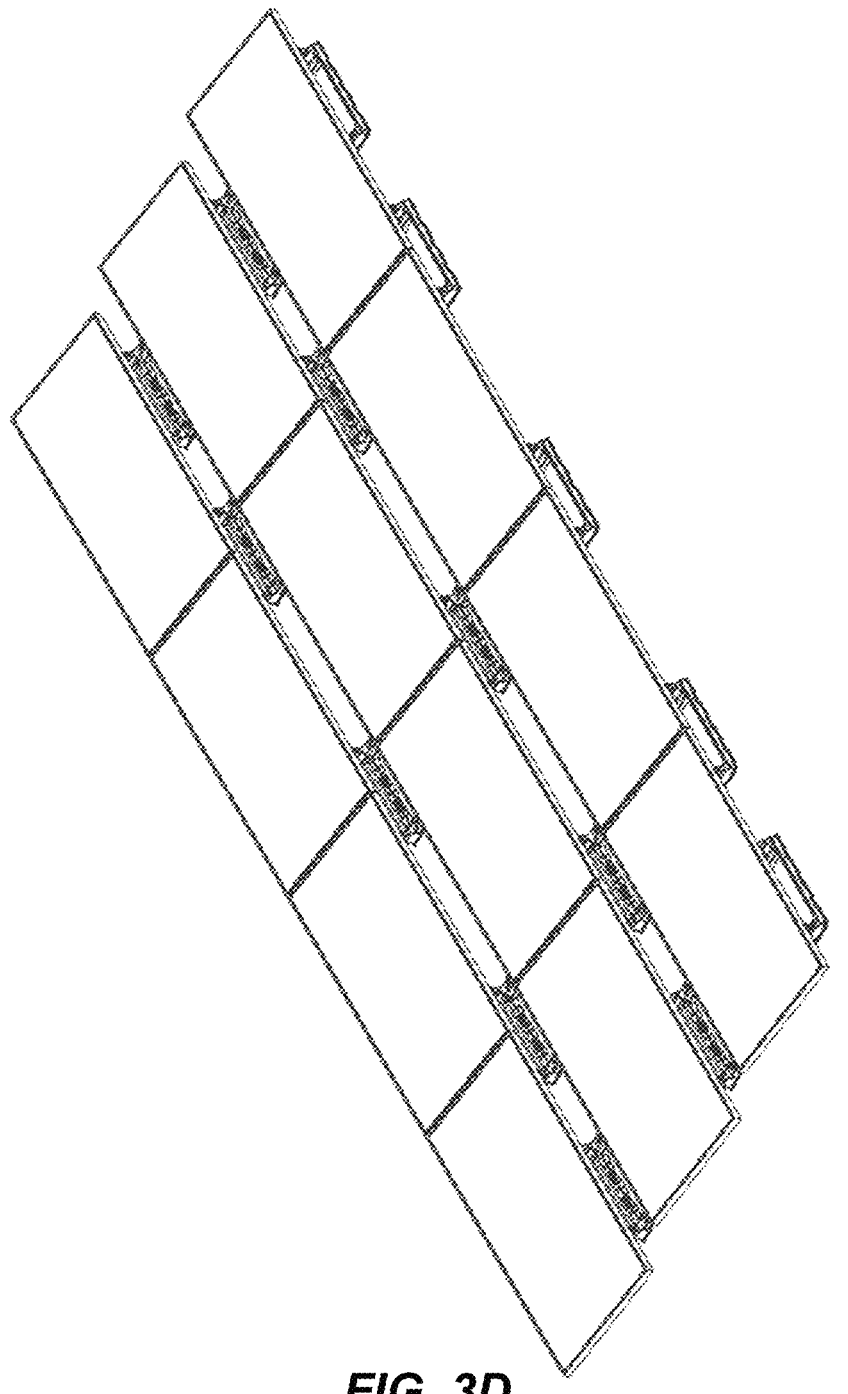

3B-3C, by spacing a plurality of mounting units 210, a plurality of solar panels 300 may be clamped using a plurality of clamping units 210. In addition, FIG. 3A shows how the post of a basket is received into the saddle and abuts against the clamping mechanism to prevent it from being loosened because the cam actuated clamp cannot be rotated when in this position. In such a manner, the clamping assembly 100 is resistant to vibration, weather related motions, etc., so that it will not come undone. FIG. 3D shows a view from above of the solar panels of FIGS. 3A-3D when used with clamp assembly 100.

Figures 4A, 4B, 4C, 4D:
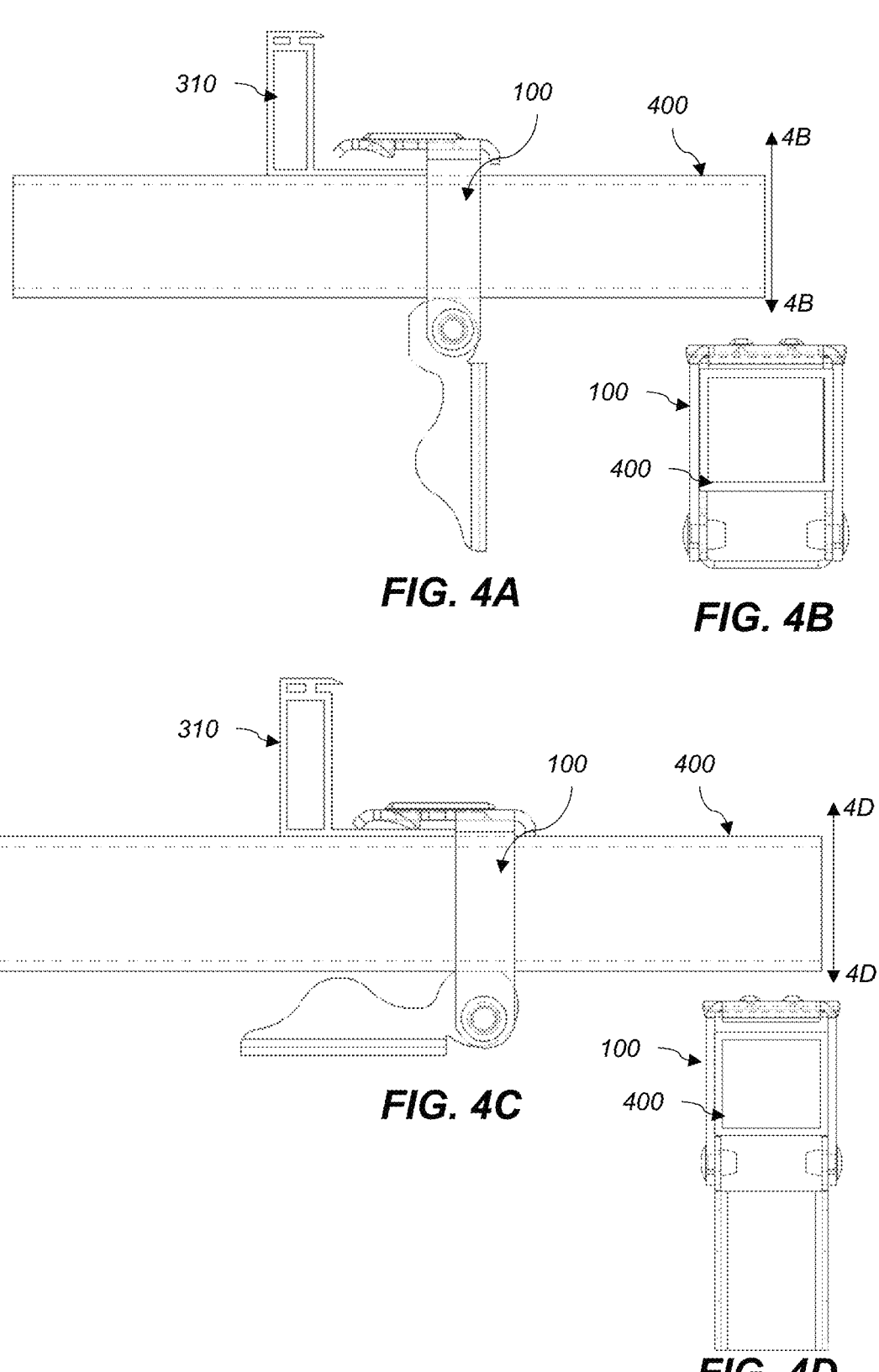
FIGS. 4A-4D illustrates an example in which the clamp assembly does not include a saddle portion, and instead the clamp portion clamps to a square tube, in accordance with one or more aspects set forth herein.

FIGS. 4A-4D illustrates an example in which the clamp assembly 100 does not include a saddle portion, and instead the clamp portion clamps to a square tube 400. FIG. 4A depicts the clamp assembly 100 in the clamped condition and placed over the square tube 400 and ready to clamp a frame portion 310. FIG. 4B depicts the clamp assembly 100 of FIG. 4A along line 4B-4B thereof, with the frame portion 310 elided. FIG. 4C depicts the clamp assembly 100 in the clamped condition and clamping the frame portion 310 to the square tube 400. FIG. 4D depicts the clamp assembly 100 of FIG. 4C along line 4D-4D thereof, with the frame portion 310 elided.

Figures 5A, 5B, 5C, 5D:
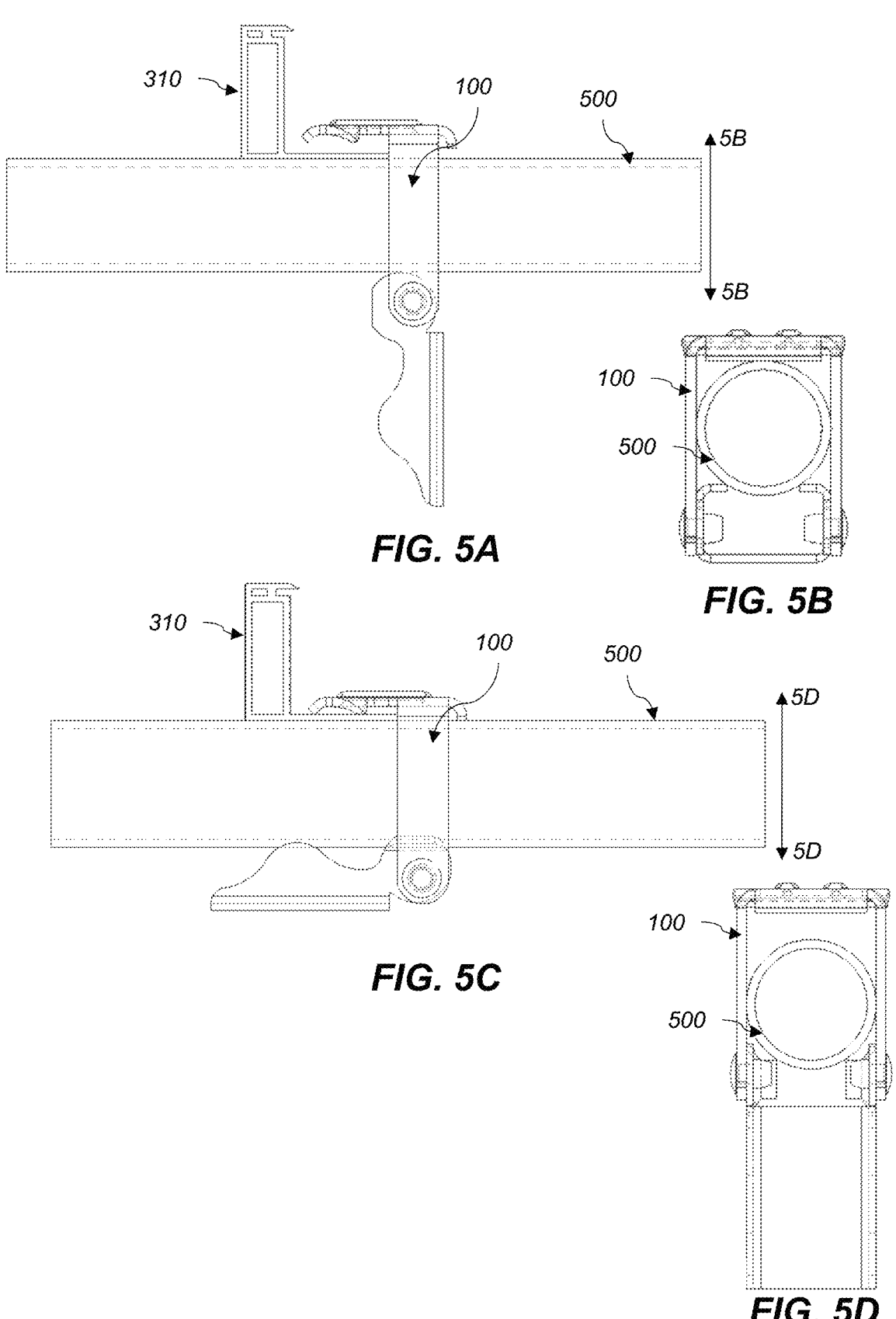
FIGS. 5A-5D illustrates an example in which the clamp assembly does not include a saddle portion, and instead the clamp portion clamps to a square tube, in accordance with one or more aspects set forth herein.

FIGS. 5A-5D illustrates an example in which the clamp assembly does not include a saddle portion, and instead the clamp portion clamps to a square tube, in accordance with one or more aspects set forth herein. FIG. 5A depicts the clamp assembly 100 in the clamped condition and placed over the round tube 500 and ready to clamp a frame portion 310. FIG. 5B depicts the clamp assembly 100 of FIG. 5A along line 5B-5B thereof, with the frame portion 310 elided. FIG. 5C depicts the clamp assembly 100 in the clamped condition and clamping the frame portion 310 to the round tube 500. FIG. 5D depicts the clamp assembly 100 of FIG. 5C along line 5D-5D thereof, with the frame portion 310 elided. As depicted in FIGS. 4A-5D, modifications to the shape of the clamp assembly 100 to accommodate different cross-sectional tubes, such as square, round, rectangular, etc., are within the scope of the present disclosure.

Thus, the clamp assembly 100 may operate in conjunction with various support portions, including a saddle 110 or tubes 400, 500 in order to clamp a solar panel to the support portion. In such a manner, the present disclosure is compatible with both railed and railless installation. For instance, the clamp assembly may be attached to a channel, flat stock, a flat section such as that of a cee purlin, etc.

Figure 6A:
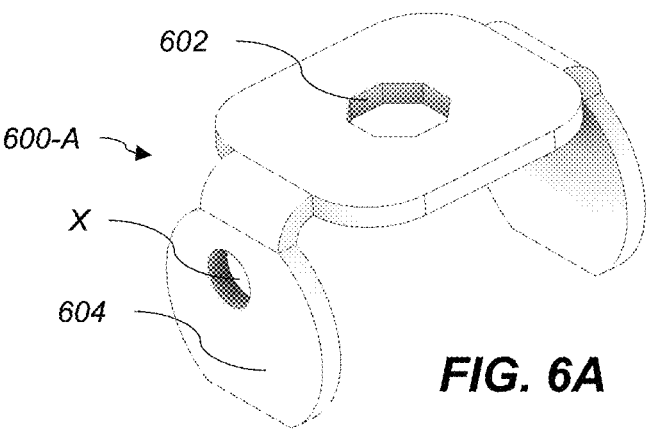
FIGS. 6A-6C illustrate embodiments of a lever portion which may be used with a compatible tool, in accordance with one or more aspects set forth herein.

FIG. 6A illustrates a lever portion 600-A which may be used with a compatible tool, as shown in FIGS. 7A-7B, 8A-8B, 9A-9B, 10A-10C and 11A-11B. In the embodiment of FIG. 6A, lever portion 600-A includes side portions 604 with openings X and a tool engagement portion 602. Lever portion 600-A may be used instead of lever portion 130 described above (see FIGS. 1A-5D).

Figure 6B:
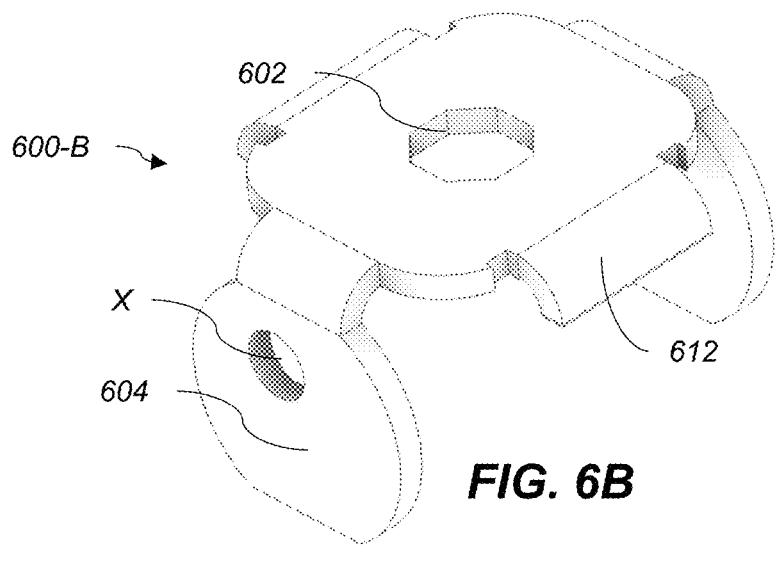

FIG. 6B illustrates a lever portion 600-B which may be used with a compatible tool, as shown in FIGS. 7A-7B, 8A-8B, 9A-9B, 10A-10C and 11A-11B. In the embodiment of FIG. 6B, lever portion 600-B includes cam portions 604 with openings X and a tool engagement portion 602. Lever portion 600-B further includes ribs 612 which are provided to add additional rigidity to lever portion 600-B. Lever portion 600-B may be used instead of lever portion 130 described above (see FIGS. 1A-5D).

Figure 6C:
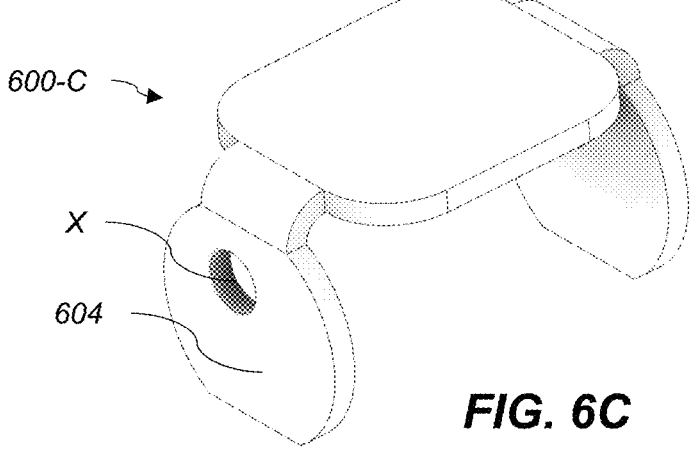

FIG. 6C illustrates a lever portion 600-C which may be used with a compatible tool, as shown in FIGS. 7A-7B, 8A-8B, 9A-9B, 10A-10C and 11A-11B. In the embodiment of FIG. 6C, lever portion 600-C includes cam portions 604 with openings X. Lever portion 600-C does not include a tool opening, and instead may be used with a wrench or similar tool. Lever portion 600-B may be used instead of lever portion 130 described above (see FIGS. 1A-5D).

Figure 7A:
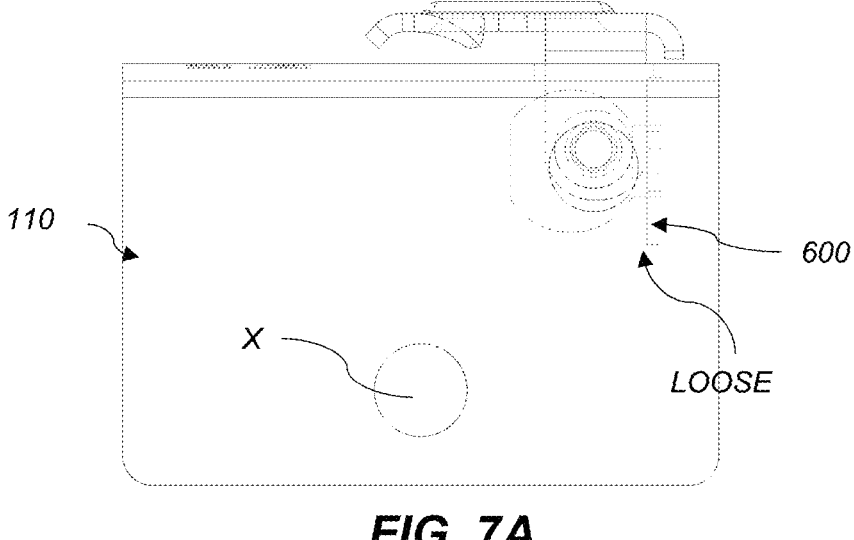
Figure 7B:
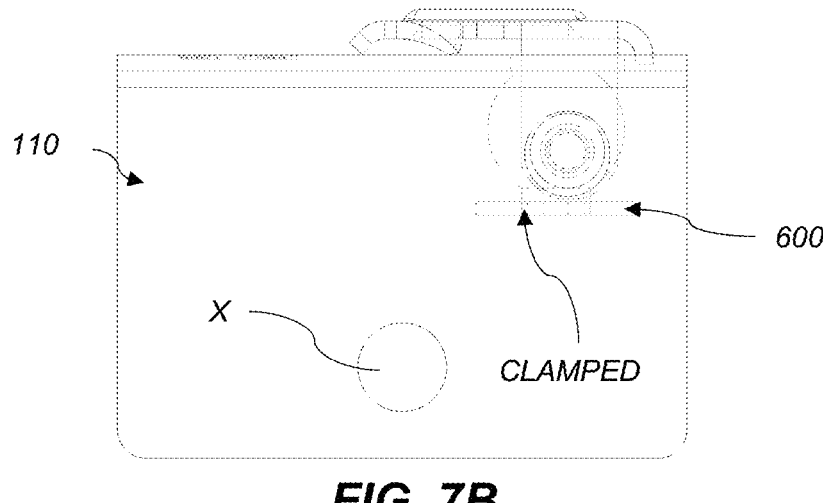

FIGS. 7A-7B illustrate operation of the lever portion 600, which may be any of lever portions 600-A-600-C. For example, in the embodiment of FIG. 7A, lever portion 600 is shown in the loose condition in combination with a saddle portion 110. In the embodiment of FIG. 7B, lever portion 600 is shown in the clamped condition in combination with the saddle portion 110.

Figures 8A, 8B:
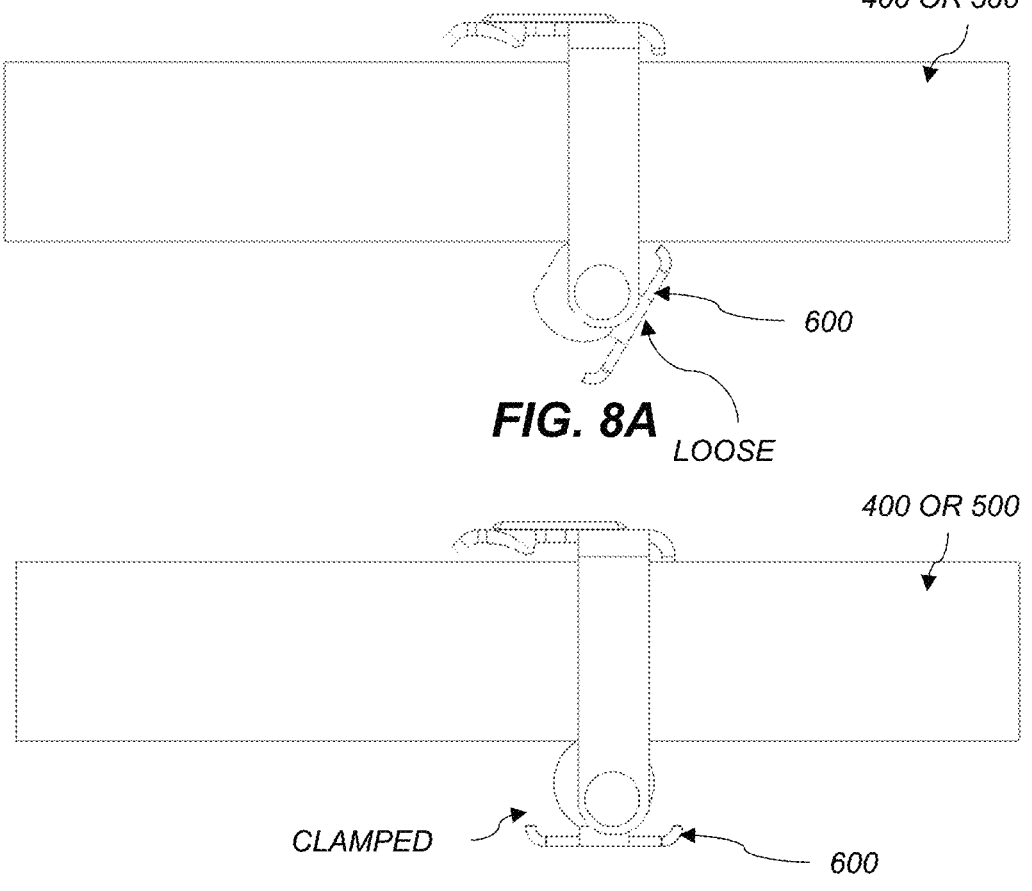

FIGS. 8A-8B illustrate operation of the lever portion 600, which may be any of lever portions 600-A-600-C. For example, in the embodiment of FIG. 8A, lever portion 600 is shown in the loose condition in combination with a square tube 400 or round tube 500. In the embodiment of FIG. 8B, lever portion 600 is shown in the clamped condition in combination with a square tube 400 or round tube 500.

Figure 9A:
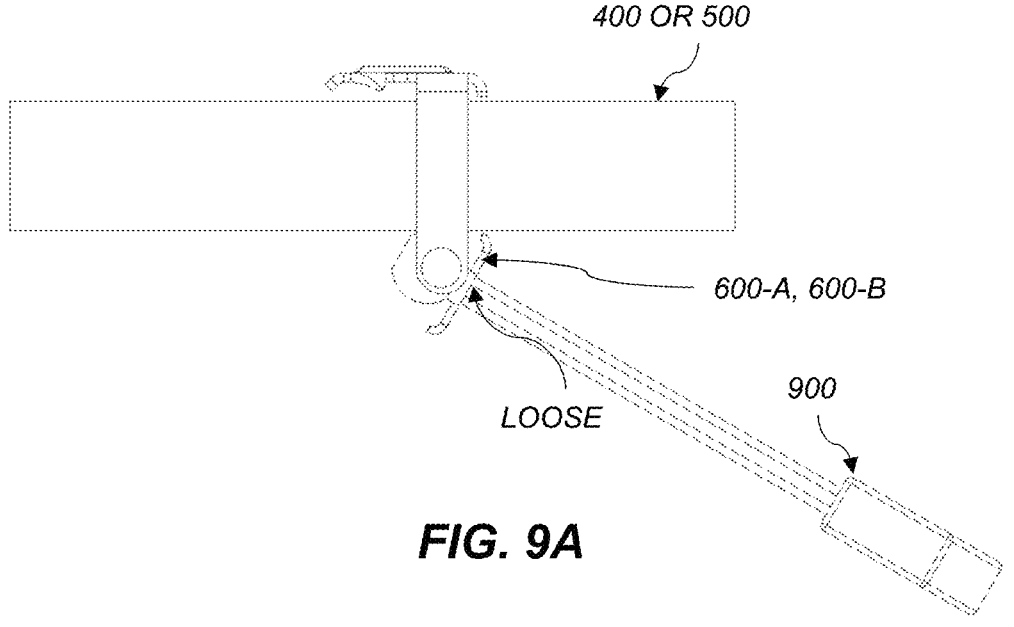
Figure 9B:
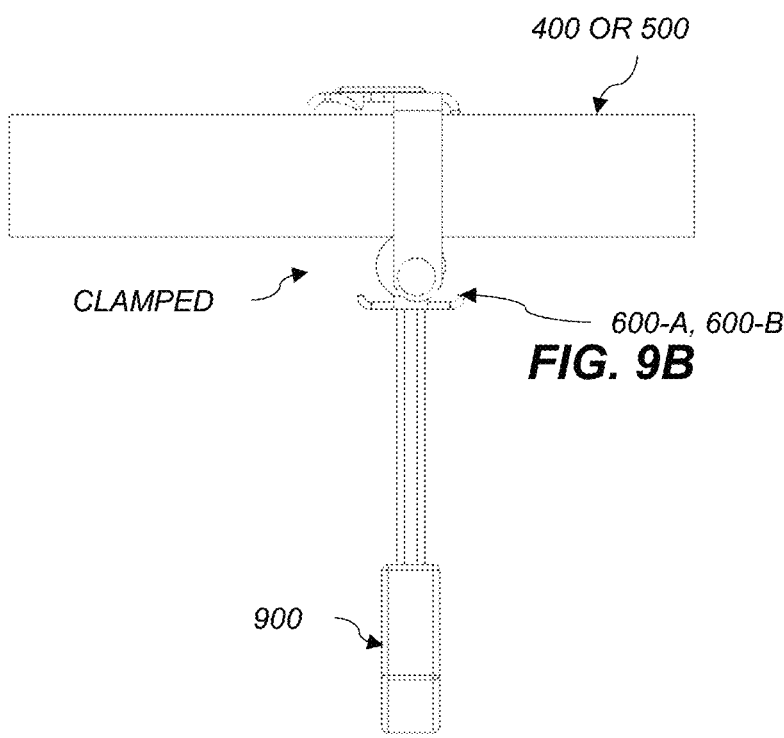

FIGS. 9A-9B illustrate operation of the lever portion 600, which may be any of lever portions 600-A-600-B having a tool engagement portion 602. For example, in the embodiment of FIG. 9A, lever portion 600-A or 600-B is shown in the loose condition in combination with a square tube 400 or round tube 500. Tool 900, which may be a screw driver, is used to move the lever portion 600A or 600B from the loose condition to the clamped condition as shown. In the embodiment of FIG. 9B, lever portion 600-A or 600-B is shown in the clamped condition in combination with a square tube 400 or round tube 500.

FIGS. 10A-10C illustrate operation of the lever portion 600, which may be any of lever portions 600-A-600-B having a tool engagement portion 602. For example, in the embodiment of FIG. 10A, lever portion 600-A or 600-B is shown in the loose condition in combination with a square tube 400 or round tube 500. Matched tool 1000, which includes a hexagonal or octagonal drive shaft end portion, is used to move the lever portion 600A or 600B from the loose condition to the clamped condition as shown. In the embodiment of FIG. 10B, lever portion 600-A or 600-B is shown in the clamped condition in combination with a square tube 400 or round tube 500. FIG. 10C shows the operation rotated to the left as compared to FIG. 10B, and shows that matched tool 1000 may advantageously include a handle with finger grips to facilitate operation.

Figure 11A:
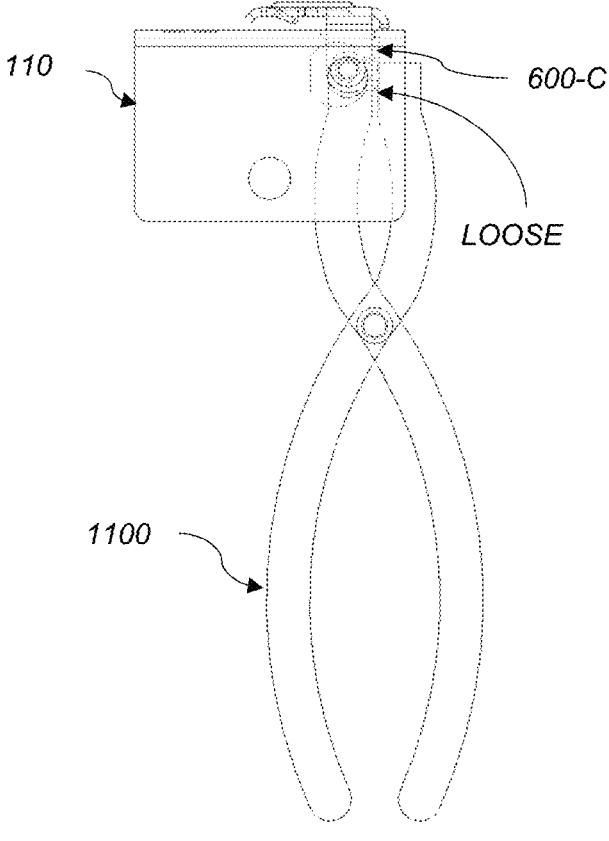
Figure 11B:
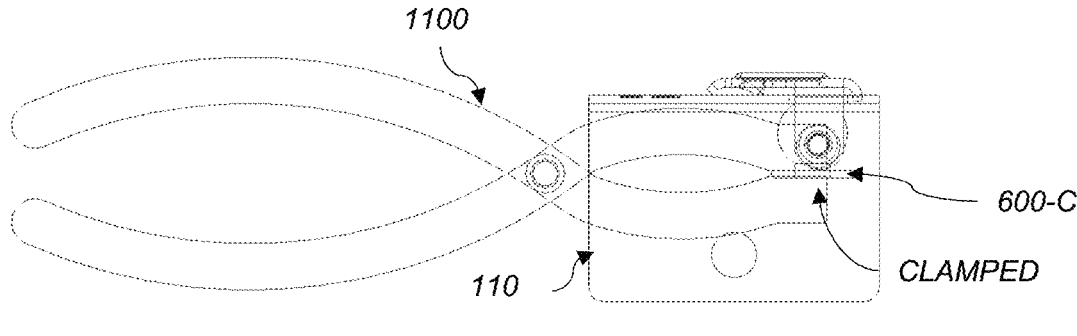

FIGS. 11A-11B illustrate operation of the lever portion 600, which may be any of lever portions 600-A-600-B having a tool engagement portion 602. For example, in the embodiment of FIG. 11A, lever portion 600-C is shown in the loose condition in combination with a square tube 400 or round tube 500. Wrench 1100 is used to move the lever portion 600A or 600B from the loose condition to the clamped condition as shown. In the embodiment of FIG. 11B, lever portion 600-C is shown in the clamped condition in combination with a square tube 400 or round tube 500.

What is claimed is:

1. A clamp assembly for clamping a solar panel, the clamp assembly comprising:
    a clamp portion comprising at least one tooth for clamping onto a first flange of the solar panel;
    a lever portion spaced apart from the clamp portion, the lever portion comprising a cam, the cam comprising a rounded surface and a flat surface;
    wherein each of the clamp portion and the lever portion comprise an opening for receiving a pivoting element, the opening being generally aligned when the clamp portion and the lever portion are fitted together; and
    wherein upon rotation of the lever portion from a position in which the rounded surface of the cam rotates along the bottom of a support portion to a position in which the flat surface of the cam locks against the bottom of the support portion, the cam urges the clamp portion into a clamped condition such that the at least one tooth clamps onto the first flange of the solar panel.

2. The clamp assembly of claim 1, wherein the lever portion comprises a tool engagement opening for engaging a tool for rotating the lever portion.

3. The clamp assembly of claim 1, wherein the support portion comprises a tube and the clamp portion and the lever portion are fitted to the tube.

4. The clamp assembly of claim 3, wherein the tube is disposed between the clamp portion and the pivoting element when the clamp assembly is fitted to the tube.

5. The clamp assembly of claim 1, wherein the support portion comprises a saddle portion, the saddle portion including an opening that is generally aligned with the openings of the clamp portion and the lever portion for receiving the pivoting element.

6. The clamp assembly of claim 5, wherein the saddle portion further comprises an additional opening for affixing the saddle portion to a fixed structure.

7. The clamp assembly of claim 1, wherein the first flange of the solar panel is the lower flange of the solar panel, and the clamp assembly is configured to clamp solar panels having variable thicknesses by clamping the lower flange.

8. A clamp assembly for mounting a solar panel to a mounting unit, the clamp assembly comprising:

a saddle portion with a means for mounting the saddle portion to a tower of the mounting unit;

a clamp portion fitted into a top of the saddle portion and comprising at least one tooth for clamping onto a first flange of the solar panel;

a lever portion fitted into a bottom of the saddle portion, the lever portion comprising a cam, the cam comprising a rounded surface and a flat surface;

wherein each of the saddle portion, the clamp portion and the lever portion comprise an opening for receiving a pivoting element, the opening being generally aligned when the saddle portion, the clamp portion and the lever portion are fitted together;

wherein upon rotation of the lever portion from a position in which the rounded surface of the cam rotates along the bottom of the saddle portion to a position in which the flat surface of the cam locks against the bottom of the saddle portion, the cam urges the clamp portion into a clamped condition such that the at least one tooth clamps onto the first flange of the solar panel; and wherein rotation of the lever portion is accomplished using a tool matched to the lever portion.

9. The clamp assembly of claim 8, wherein the clamp portion further comprises at least one rib disposed on the body of the clamp portion such that the rib strengthens the clamp portion to mitigate loosening of the at least one tooth clamped onto the first flange of the solar panel when the clamp portion is in the clamped condition.

10. The clamp assembly of claim 8, wherein the clamp assembly is riveted at the opening.

11. A system for mounting of a solar panel to a plurality of mounting units using a plurality of clamp assemblies, each clamp assembly of the plurality of clamp assemblies comprising:

a saddle portion with a means for mounting the saddle portion to one tower of one mounting unit;

a clamp portion fitted into a top of the saddle portion and comprising at least one tooth for clamping onto a flange of the solar panel;

a lever portion fitted into a bottom of the saddle portion, the lever portion comprising a cam, the cam comprising a rounded surface and a flat surface;

wherein each of the saddle portion, the clamp portion and the lever portion comprise an opening for receiving a pivoting element, the opening being generally aligned when the saddle portion, the clamp portion and the lever portion are fitted together;

wherein upon rotation of the lever portion from a position in which the rounded surface of the cam rotates along the bottom of the saddle portion to a position in which the flat surface of the cam locks against the bottom of the saddle portion, the cam urges the clamp portion into a clamped condition such that the at least one tooth clamps onto a flange of the solar panel;

wherein upon continued rotation of the lever portion, the lever portion contacts the bottom of the saddle portion to prevent further rotation of the lever portion; and wherein each clamp assembly of the plurality of clamping assemblies is mounted to a different tower of the plurality of mounting units such that the solar panel is mounted at an angle to the mounting units.

12. The system of claim 11, wherein the clamp portion further comprises at least one rib disposed on the body of the clamp portion such that the rib strengthens the clamp portion to mitigate loosening of the at least one tooth clamped onto the first flange of the solar panel when the clamp portion is in the clamped condition.

13. The system of claim 11, wherein the clamp assembly is riveted at the opening.

14. The system of claim 11, wherein the solar panel comprises a top flange and a bottom flange, wherein the flange of the solar panel clamped by the clamp portion is the bottom flange of the solar panel, wherein the mounting facilitates the ability to clamp to the bottom flange notwithstanding that the bottom flange is below the top flange of the solar panel.

15. A clamp assembly for clamping a solar panel, the clamp assembly comprising:

a clamp portion for clamping onto a first flange of the solar panel;

a lever portion spaced apart from the clamp portion, the lever portion comprising a cam, the cam comprising a rounded surface and a flat surface;

wherein each of the clamp portion and the lever portion comprise an opening for receiving a pivoting element, the opening being generally aligned when the clamp portion and the lever portion are fitted together; and wherein upon rotation of the lever portion from a position in which the rounded surface of the cam rotates alongside the bottom of a support portion to a position in which the flat surface of the cam locks against the bottom of the support portion, the cam urges the clamp portion into a clamped condition such that the clamp portion clamps onto the first flange of the solar panel.

16. The clamp assembly of claim 15, wherein the lever portion comprises a tool engagement portion for a tool to achieve rotation of the lever portion.

17. The clamp assembly of claim 15, wherein the lever portion requires a tool to achieve rotation of the lever portion.

18. The clamp assembly of claim 15, wherein the lever portion includes a portion allowing manual rotation of the lever portion.

* * * * *